(12) United States Patent
Sakamoto et al.

(10) Patent No.: US 12,338,773 B2
(45) Date of Patent: Jun. 24, 2025

(54) GAS TURBINE ENGINE HAVING A COMPRESSOR, COMBUSTOR AND TURBINE ALIGNED ALONG A ROTATING SHAFT

(71) Applicant: KAWASAKI JUKOGYO KABUSHIKI KAISHA, Kobe (JP)

(72) Inventors: Sho Sakamoto, Kobe (JP); Hiromasa Ikai, Kobe (JP); Tatsuya Okuwa, Kobe (JP); Hikaru Maesato, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/799,029

(22) PCT Filed: Feb. 12, 2021

(86) PCT No.: PCT/JP2021/005296
§ 371 (c)(1),
(2) Date: Aug. 11, 2022

(87) PCT Pub. No.: WO2021/162102
PCT Pub. Date: Aug. 19, 2021

(65) Prior Publication Data
US 2023/0069494 A1    Mar. 2, 2023

(30) Foreign Application Priority Data

Feb. 14, 2020  (JP) ................. 2020-023204

(51) Int. Cl.
*F02C 7/16* (2006.01)
*F02C 7/22* (2006.01)

(52) U.S. Cl.
CPC .......... *F02C 7/16* (2013.01); *F02C 7/22* (2013.01); *F05D 2220/323* (2013.01); *F05D 2240/35* (2013.01); *F05D 2260/213* (2013.01)

(58) Field of Classification Search
None
See application file for complete search history.

(56) References Cited

U.S. PATENT DOCUMENTS

| 6,836,086 B1 * | 12/2004 | Goldberg | .................. F02C 7/26 |
| | | | 318/140 |
| 2003/0010013 A1 * | 1/2003 | Johnstone | ............... F02C 3/165 |
| | | | 60/39.35 |

(Continued)

FOREIGN PATENT DOCUMENTS

| JP | 2004-132359 A | 4/2004 |
| JP | 2012-518151 A | 8/2012 |
| JP | 2015-052315 A | 3/2015 |

OTHER PUBLICATIONS

International Search Report for PCT/JP2021/005296 dated Apr. 13, 2021.

*Primary Examiner* — Gerald L Sung
*Assistant Examiner* — Jacek Lisowski
(74) *Attorney, Agent, or Firm* — Sughrue Mion, PLLC

(57) ABSTRACT

A gas turbine engine includes: at least one fuel pump arranged outside a casing; at least one electric motor that is arranged outside the casing and drives the at least one fuel pump; a fuel inflow member including a fuel inflow passage through which fuel to be sucked by the fuel pump flows; and a fuel outflow member including a fuel outflow passage through which the fuel discharged from the fuel pump flows toward a combustor. The fuel inflow member includes a heat exchanger portion that is thermally connected to the electric motor. The heat exchanger portion is adjacent to the electric motor and cools the electric motor by heat exchange between the electric motor and the fuel flowing through the heat exchanger portion.

6 Claims, 3 Drawing Sheets

(56) References Cited

U.S. PATENT DOCUMENTS

| | | |
|---|---|---|
| 2004/0011018 A1 | 1/2004 | Bouiller et al. |
| 2011/0296846 A1 | 12/2011 | Aurousseau |
| 2016/0167801 A1 | 6/2016 | Haskins et al. |
| 2017/0114787 A1 | 4/2017 | Brookes et al. |
| 2017/0184095 A1 | 6/2017 | Brookes et al. |
| 2018/0230948 A1* | 8/2018 | Kwak .................... H02K 5/203 |
| 2020/0088099 A1* | 3/2020 | Roberge ................. F02C 7/224 |
| 2020/0256252 A1* | 8/2020 | Smith ...................... F02C 9/26 |

* cited by examiner

GAS TURBINE ENGINE HAVING A COMPRESSOR, COMBUSTOR AND TURBINE ALIGNED ALONG A ROTATING SHAFT

CROSS REFERENCE TO RELATED APPLICATIONS

This application is a National Stage of International Application No. PCT/JP2021/005296 filed Feb. 12, 2021, claiming the benefit of priority based on Japanese Patent Application No. 2020-023204 filed Feb. 14, 2020, the entire contents of which are incorporated herein by reference.

TECHNICAL FIELD

The present disclosure relates to a gas turbine engine in which a compressor, a combustor, and a turbine are arranged so as to be lined up along a rotating shaft.

BACKGROUND ART

Accessories (such as a power generator, a fuel pump, and a lubricating oil pump), an accessory gear box, and the like are attached to an outer peripheral surface of a casing of a gas turbine engine (see PTL 1, for example). The accessories are mechanically driven by utilizing rotational power of the rotating shaft of the gas turbine engine. Specifically, the rotational power is taken out from the rotating shaft in the casing through a power transmission mechanism to an outside of the casing. Then, the rotational power is reduced in speed by the accessory gear box and transmitted to the accessories.

CITATION LIST

Patent Literature

PTL 1: Japanese Laid-Open Patent Application Publication No. 2004-132359

SUMMARY OF INVENTION

Technical Problem

In some cases, the gas turbine engine is required to be downsized by reducing a frontal projected area of the gas turbine engine as much as possible. However, according to the current gas turbine engines, since the accessories disposed on the outer peripheral surface of the casing are large, the frontal projected area of the gas turbine engine is large. Moreover, since the temperature of fuel lowers under a low-temperature environment, energy efficiency and combustion performance may deteriorate.

An object of the present disclosure is to downsize a gas turbine engine and prevent energy efficiency and combustion performance under a low-temperature environment from deteriorating.

Solution to Problem

A gas turbine engine according to one aspect of the present disclosure is a gas turbine engine in which a compressor, a combustor, and a turbine are arranged so as to be lined up along a rotating shaft. The gas turbine engine includes: a casing accommodating the compressor, the combustor, and the turbine; at least one fuel pump arranged outside the casing; at least one electric motor that is arranged outside the casing and drives the at least one fuel pump; a fuel inflow member including a fuel inflow passage through which fuel to be sucked by the fuel pump flows; and a fuel outflow member including a fuel outflow passage through which the fuel discharged from the fuel pump flows toward the combustor. The fuel inflow member includes a heat exchanger portion that is thermally connected to the electric motor. The heat exchanger portion is adjacent to the electric motor and cools the electric motor by heat exchange between the electric motor and the fuel flowing through the heat exchanger portion.

According to the above configuration, the gas turbine engine is downsized by using an electric pump as the fuel pump. In addition, the electric motor is cooled by the fuel, and this can avoid a case where the output of the electric motor is limited by heat generation, and this requires an increase in the number of electric motors. To be specific, the electric motor is driven, and the fuel flowing through the fuel inflow passage so as to be sucked into the fuel pump cools the electric motor. Therefore, the operating electric motor can be cooled without a cooling medium and a pump dedicated for cooling of the electric motor. On this account, the number of parts is reduced, and the number of electric motors is prevented from increasing. Thus, the gas turbine engine can be downsized. Moreover, since the fuel increases in temperature by the heat exchange with the operating electric motor, deterioration of energy efficiency and combustion performance under a low-temperature environment can be prevented.

Advantageous Effects of the Disclosure

The present aspects of the disclosure can downsize a gas turbine engine and prevent energy efficiency and combustion performance under a low-temperature environment from deteriorating.

DESCRIPTION OF EMBODIMENTS

Hereinafter, embodiments will be described with reference to the drawings. In the following description, "front" denotes an upstream side in a direction in which air flows in an engine, and "rear" denotes a downstream side in the direction in which the air flows in the engine. To be specific, "front" denotes a side where a fan is disposed in an axial direction of a rotating shaft of the engine, and "rear" denotes an opposite side of the side where the fan is disposed in the axial direction of the rotating shaft of the engine. A "radial direction" denotes a direction orthogonal to a rotation axis of the rotating shaft of the engine. A "circumferential direction" denotes a direction around the rotation axis of the rotating shaft of the engine.

Embodiment 1

Figure 1:
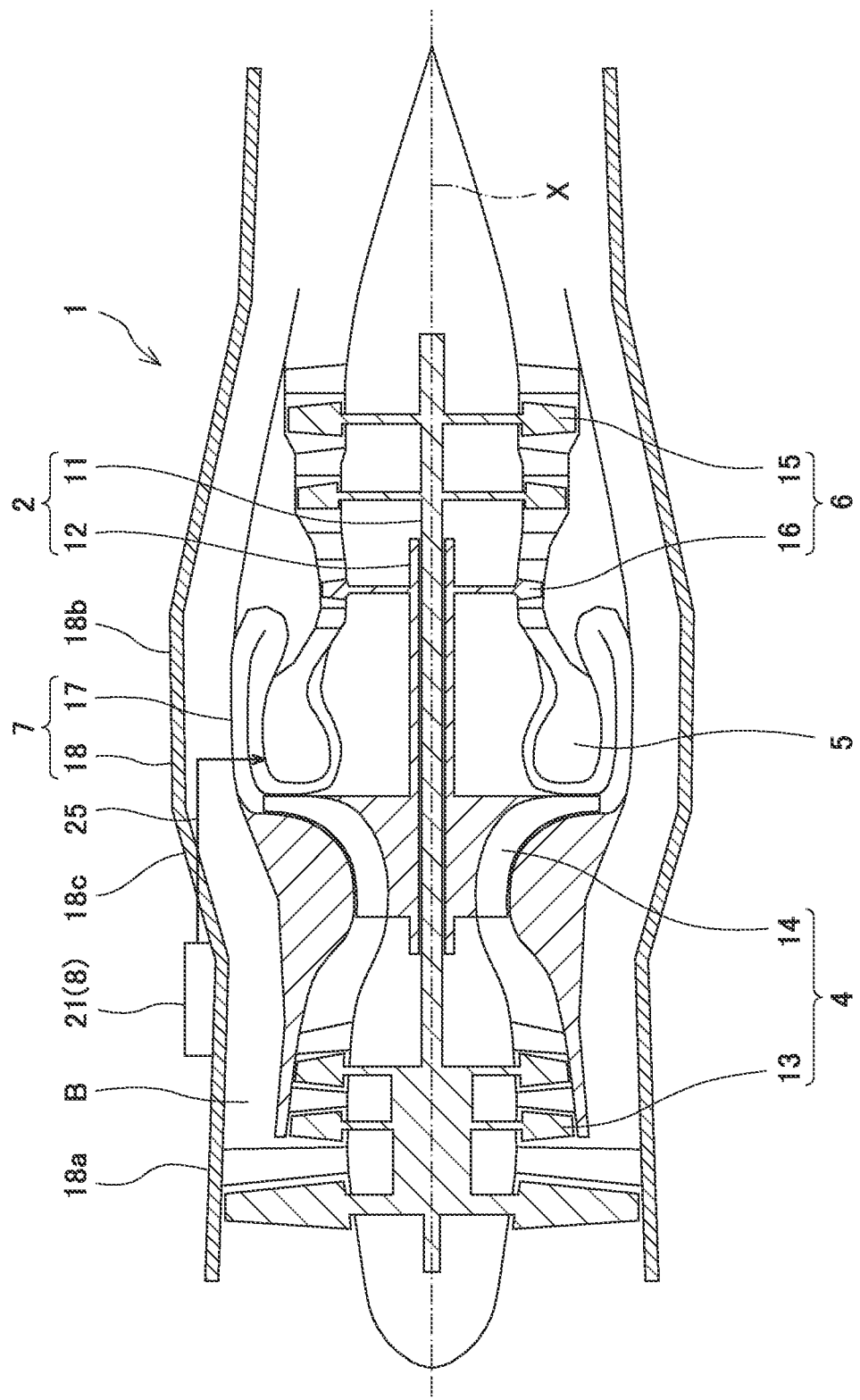
FIG. 1 is a sectional view of an aircraft gas turbine engine according to Embodiment 1.
Figure 2:
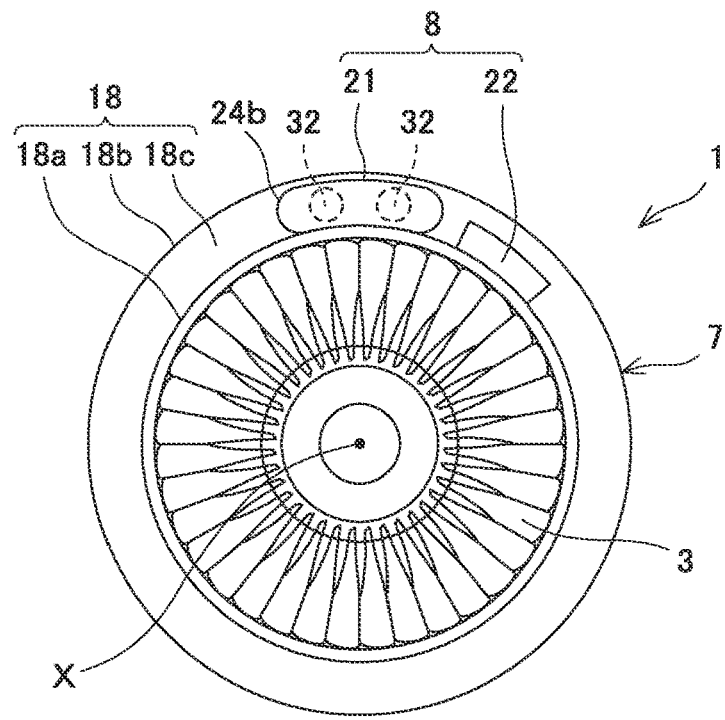
FIG. 2 is a front view of the gas turbine engine of FIG. 1 when viewed from a front side.

FIG. 1 is a sectional view of an aircraft gas turbine engine 1 according to Embodiment 1. FIG. 2 is a front view of the gas turbine engine 1 of FIG. 1 when viewed from the front side. As shown in FIG. 1, the aircraft gas turbine engine 1 includes a rotating shaft 2, a fan 3, a compressor 4, a combustor 5, a turbine 6, and a casing 7. The rotating shaft 2 extends in a front-rear direction of the gas turbine engine 1. The fan 3 is connected to a front portion of the rotating shaft 2 and rotates together with the rotating shaft 2. The compressor 4, the combustor 5, and the turbine 6 are lined up in this order from the front side to the rear side along the rotating shaft 2. The casing 7 is a tubular object having an axis that coincides with a rotation axis X of the rotating shaft 2 and accommodates the rotating shaft 2, the fan 3, the compressor 4, the combustor 5, and the turbine 6. The use of the gas turbine engine 1 is not limited to propulsion of the aircraft, and the gas turbine engine 1 may be used as a power source for uses of the aircraft other than the propulsion.

Specifically, the gas turbine engine 1 is a two-shaft gas turbine engine. The compressor 4 includes a low-pressure compressor 13 and a high-pressure compressor 14 arranged behind the low-pressure compressor 13. For example, the low-pressure compressor 13 is an axial flow compressor, and the high-pressure compressor 14 is a centrifugal compressor. However, the types of the low-pressure compressor 13 and the high-pressure compressor 14 are not limited to these. The turbine 6 includes a low-pressure turbine 15 and a high-pressure turbine 16 arranged in front of the low-pressure turbine 15. The rotating shaft 2 includes a low-pressure shaft 11 and a high-pressure shaft 12. The low-pressure shaft 11 couples the low-pressure compressor 13 to the low-pressure turbine 15, and the high-pressure shaft 12 couples the high-pressure compressor 14 to the high-pressure turbine 16. The high-pressure shaft 12 is a tubular shaft including a hollow space therein. The low-pressure shaft 11 is inserted into the hollow space of the high-pressure shaft 12. The low-pressure turbine 16 is coupled through the low-pressure shaft 11 to the fan 3 arranged in front of the compressor 4.

The casing 7 includes an inner shell 17 and an outer shell 18. Each of the inner shell 17 and the outer shell 18 has a substantially cylindrical shape. The inner shell 17 accommodates the compressor 4, the combustor 5, and the turbine 6. The outer shell 18 is arranged concentrically with the inner shell 17 while being away from the inner shell 17 outward in the radial direction. A cylindrical bypass passage B is formed between the inner shell 17 and the outer shell 18. Air sucked by the fan 3 flows through the bypass passage B and is discharged to the rear side.

As shown in FIGS. 1 and 2, an outer peripheral surface of the casing 7 includes a first tubular region 18a, a second tubular region 18b, and a third tubular region 18c. Electrically-operated accessories 8 are disposed in the first tubular region 18a. The second tubular region 18b is located behind the first tubular region 18a. The third tubular region 18c connects the first tubular region 18a and the second tubular region 18b to each other. The first tubular region 18a is smaller in diameter than the second tubular region 18b. The third tubular region 18c is an inclined tubular region that gradually increases in diameter toward the rear side. The first tubular region 18a is located at a position corresponding to at least the low-pressure compressor 13 in the front-rear direction (rotation axis direction). The second tubular region 18b is located at a position corresponding to at least the combustor 5 in the front-rear direction (rotation axis direction).

The electrically-operated accessories 8 are arranged along an outer peripheral surface of the first tubular region 18a of the outer shell 18. When viewed from the front side, the electrically-operated accessories 8 are arranged at a radially inner side of an outer peripheral surface of the second tubular region 18b. The electrically-operated accessories 8 may project outward in the radial direction beyond the outer peripheral surface of the second tubular region 18b when viewed from the front side. The electrically-operated accessories 8 may be disposed in the second tubular region 18b and arranged at a radially inner side of a member, such as a flange (not shown) projecting from the second tubular region 18b, which has a largest projected area when viewed from the front side. Examples of the electrically-operated accessories 8 include a fuel pump unit 21 and a motor controller 22. The fuel pump unit 21 supplies fuel to the combustor 5. The motor controller 22 controls the fuel pump unit 21 in accordance with predetermined sensor data and an external operation command.

Figure 3:
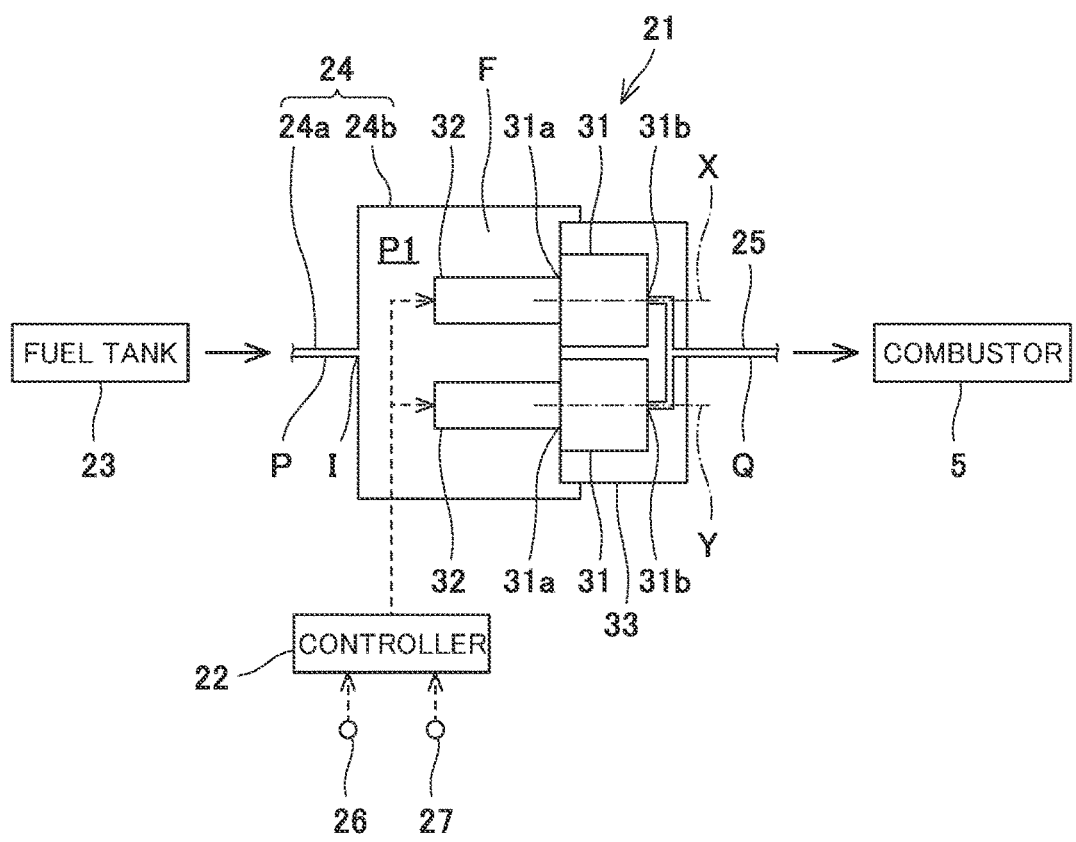
FIG. 3 is a block diagram of a fuel supply system of the gas turbine engine of FIG. 1.

FIG. 3 is a block diagram of a fuel supply system of the gas turbine engine 1 of FIG. 1. As shown in FIGS. 2 and 3, the fuel pump unit 21 includes fuel pumps 31, electric motors 32, and a unit housing 33. The fuel pumps 31 are, for example, displacement pumps. FIG. 3 shows two fuel pumps 31 and two electric motors 32. However, each of the number of fuel pumps 31 and the number of electric motors 32 may be three or more. Or, each of the number of fuel pumps 31 and the number of electric motors 32 may be one.

The fuel pumps 31 are lined up in the circumferential direction along the outer peripheral surface of the first tubular region 18a of the outer shell 18. The fuel pumps 31 are lined up such that rotation axes Y of the fuel pumps 31 are parallel to the rotation axis X of the rotating shaft 2. The fuel pumps 31 are accommodated in one unit housing 33. The unit housing 33 has, for example, an arch shape along the outer peripheral surface of the first tubular region 18a of the outer shell 18. The unit housing 33 accommodating the fuel pumps 31 is opposed to the third tubular region 18c (see FIGS. 1 and 2) of the outer shell 18 from the front side. The unit housing 33 may be omitted.

The electric motors 32 are connected to the fuel pumps 31 one-to-one. Each electric motor 32 is adjacent to the corresponding fuel pump 31 in a direction in which the rotation axis Y of the fuel pump 31 extends. Each electric motor 32 drives the corresponding fuel pump 31. The electric motors 32 are lined up in the circumferential direction along the outer peripheral surface of the first tubular region 18a of the outer shell 18. The rotation axis of each electric motor 32 coincides with, for example, the rotation axis Y of the corresponding fuel pump 31.

The electric motors 32 are arranged outside the unit housing 33. Each electric motor 32 has, for example, a substantially circular outer shape when viewed from the front side. The electric motors 32 are lined up in the circumferential direction along the outer peripheral surface of the first tubular region 18a of the outer shell 18 and are connected to each other in parallel. The electric motors 32 are arranged in front of the fuel pumps 31.

An inlet port 31a of each fuel pump 31 is located at a side (front side) of the fuel pump 31 which side is close to the electric motor 32 in a direction along the rotation axis Y. An outlet port 31b of each fuel pump 31 is located at an opposite side (rear side) of the inlet port 31a of the fuel pump 31. The positions of the inlet port 31a and the outlet port 31b in each fuel pump 31 are not limited to these.

The fuel pumps 31 suck the fuel, stored in a fuel tank 23, through a fuel inflow member 24. The fuel inflow member 24 includes a fuel inflow passage P through which fuel F to be sucked by the fuel pumps 31 flows. The fuel F discharged by the fuel pumps 31 is supplied through a fuel outflow member 25 to the combustor 5. The fuel outflow member 25 includes a fuel outflow passage Q through which the fuel discharged from the fuel pumps 31 flows toward the combustor 5.

The fuel inflow member 24 introduces the fuel, stored in the fuel tank 23, to the inlet ports 31a of the fuel pumps 31 by negative pressure generated by the fuel pumps 31. The fuel inflow member 24 includes an inflow pipe portion 24a and a common buffer tank portion 24b (heat exchanger portion). The inflow pipe portion 24a is connected to the fuel tank 23. The common buffer tank portion 24b is connected to the inflow pipe portion 24a in series. The common buffer tank portion 24b is adjacent to the electric motors 32. The common buffer tank portion 24b serves as the heat exchanger portion that is thermally connected to the electric motors 32.

The common buffer tank portion 24b includes a common buffer space P1 and a fuel inlet I through which the fuel F supplied from the inflow pipe portion 24a flows into the common buffer space P1. The fuel inlet I is arranged at a front side of the common buffer tank portion 24b. Each electric motor 32 is arranged between the fuel inlet I and the corresponding fuel pump 31 in a direction along the rotation axis of the electric motor 32. To be specific, the fuel F flowing from the fuel inlet I toward the inlet ports 31a of the fuel pumps 31 flows along the electric motors 32. It is desirable that the fuel F flow along the electric motors 32. However, the fuel inlet I may be located at an engine circumferential end surface of the common buffer tank portion 24b.

Specifically, the common buffer tank portion 24b covers the entire electric motors 32 such that the electric motors 32 are accommodated in one common buffer space P1. To be specific, the electric motors 32 are immersed in the fuel F that exists in the common buffer space P1 in the common buffer tank portion 24b. Outer surfaces of the electric motors 32 are entirely located away from an inner wall surface of the common buffer tank portion 24b. However, the outer surfaces of the electric motors 32 may be partially in contact with the inner wall surface of the common buffer tank portion 24b. Moreover, the electric motors 32 may be partially immersed in the fuel F in the the buffer tank portions 124b.

The common buffer tank portion 24b has an arch shape along the outer peripheral surface of the first tubular region 18a of the outer shell 18. For example, the common buffer tank portion 24b has a similar shape to the unit housing 33 when viewed from the front side. The common buffer tank portion 24b is directly connected to the unit housing 33 (or the fuel pumps 31). The common buffer tank portion 24b may be connected to the unit housing 33 (or the fuel pumps 31) through a pipe.

The fuel outflow member 25 collects the fuel discharged from the outlet ports 31b of the fuel pumps 31 and introduces the fuel to the combustor 5. The fuel outflow member 25 is arranged at an opposite side of the electric motors 32 across the fuel pumps 31. The fuel outflow member 25 is, for example, a pipe. The fuel outflow member 25 penetrates the third region 18c of the outer shell 18 and extends toward the combustor 5.

When the gas turbine engine 1 starts, the fuel stored in the fuel tank 23 flows through the inflow pipe portion 24a and the common buffer tank portion 24b and is sucked into the inlet ports 31a of the fuel pumps 31. At this time, the common buffer tank portion 24b cools the electric motors 32 by heat exchange between the fuel F flowing through the common buffer tank portion 24b and the electric motors 32. When the electric motors 32 generate heat, the fuel pumps 31 are driven. The flow of the fuel F is generated in the common buffer space P1, and the fuel F in the common buffer space P1 is replaced. Therefore, the cooling performance of the electric motors 32 is stabilized.

An output side of the motor controller 22 is electrically connected to the electric motors 32. An input side of the motor controller 22 is connected to a rotational frequency sensor 26 and a flight controller 27. The rotational frequency sensor 26 detects a rotational frequency of the rotating shaft 2. A driving operation of a pilot is input to the flight controller 27. The motor controller 22 controls each of the electric motors 32 of the fuel pump unit 21 in accordance with an input including the rotational frequency detected by the rotational frequency sensor 26 and a driving command value from the flight controller 27. The rotational frequency sensor 26 is not limited to a device that directly detects the rotation of the rotating shaft 2 and may be a device that detects the rotational frequency of the rotating shaft 2 from, for example, the voltage of a power generator (not shown) that operates in association with the rotating shaft 2.

For example, when the above input satisfies a predetermined condition, the motor controller 22 determines the electric motor 32 that is to be stopped among the electric motors 32. When the number of operating electric motors 32 decreases, and therefore, the total amount of heat generated decreases, the flow rate of the fuel F in the common buffer space P1 also decreases. Therefore, wasteful energy consumption for cooling is prevented.

According to the above-described configuration, the gas turbine engine 1 is downsized by using electric pumps as the fuel pumps 31. In addition, the electric motors 32 are cooled by the fuel F, and this can avoid a case where the outputs of the electric motors 32 are limited by heat generation, and this requires an increase in the number of electric motors 32. To be specific, the electric motors 32 are driven, and the fuel F flowing through the fuel inflow passage P so as to be sucked into the fuel pumps 31 cools the electric motors 32. Therefore, the operating electric motors 32 can be cooled without a cooling medium and a pump dedicated for cooling of the electric motors 32. On this account, the number of parts is reduced, and the number of electric motors 32 is prevented from increasing. Thus, the gas turbine engine 1 can be downsized.

Moreover, the fuel F increases in temperature by the heat exchange with the operating electric motors 32. Therefore, deterioration of combustion performance by, for example, deterioration of a fuel spraying state under a low-temperature environment, deterioration of energy efficiency by, for example, pressure loss due to an increase in viscosity under a low-temperature environment, and the like can be prevented.

Moreover, the common buffer tank portion 24b of the fuel inflow member 24 is adjacent to the electric motors 32 and covers the electric motors 32. Therefore, the heat exchange between the fuel F flowing through the fuel inflow member 24 and the electric motors 32 can be efficiently performed by a simple configuration. Specifically, since the electric motors 32 are immersed in the fuel F in the common buffer tank portion 24b, the heat exchange between the fuel F flowing through the fuel inflow member 24 and the electric motors 32 can be promoted.

Moreover, the common buffer tank portion 24b accommodates the electric motors 32. Since the fuel F in the common buffer tank portion 24b can exchange heat with the electric motors 32, the structure can be simplified. Furthermore, even when driving states (outputs) of the electric motors 32 are different from each other, and therefore, temperatures of the electric motors 32 are different from each other, the fuel F of the common buffer tank portion 24b can efficiently exchange heat with the electric motor 32 having a higher temperature between the electric motors 32. Thus, the efficient heat exchange is realized regardless of the operation state.

Moreover, the electric motors 32 are lined up in the circumferential direction along the outer peripheral surface of the casing 7, and the common buffer tank portion 24b has an arch shape along the outer peripheral surface of the casing 7. Therefore, while realizing an adequate volume of the common buffer space P1, a projection amount of the common buffer tank portion 24b outward in the radial direction from the casing 7 can be made small or zero. Thus, the frontal projected area of the gas turbine engine 1 can be reduced, and the air resistance can be suppressed.

Moreover, the fuel inlet I of the common buffer tank portion 24b is located at an opposite side of the positions of the fuel pumps 31 across the electric motors 32. Therefore, the heat exchange between the fuel F and the electric motors 32 can be efficiently performed by the flow of the fuel F from the fuel inlet I toward the fuel pumps 31 in the common buffer space P1.

Embodiment 2

Figure 4:
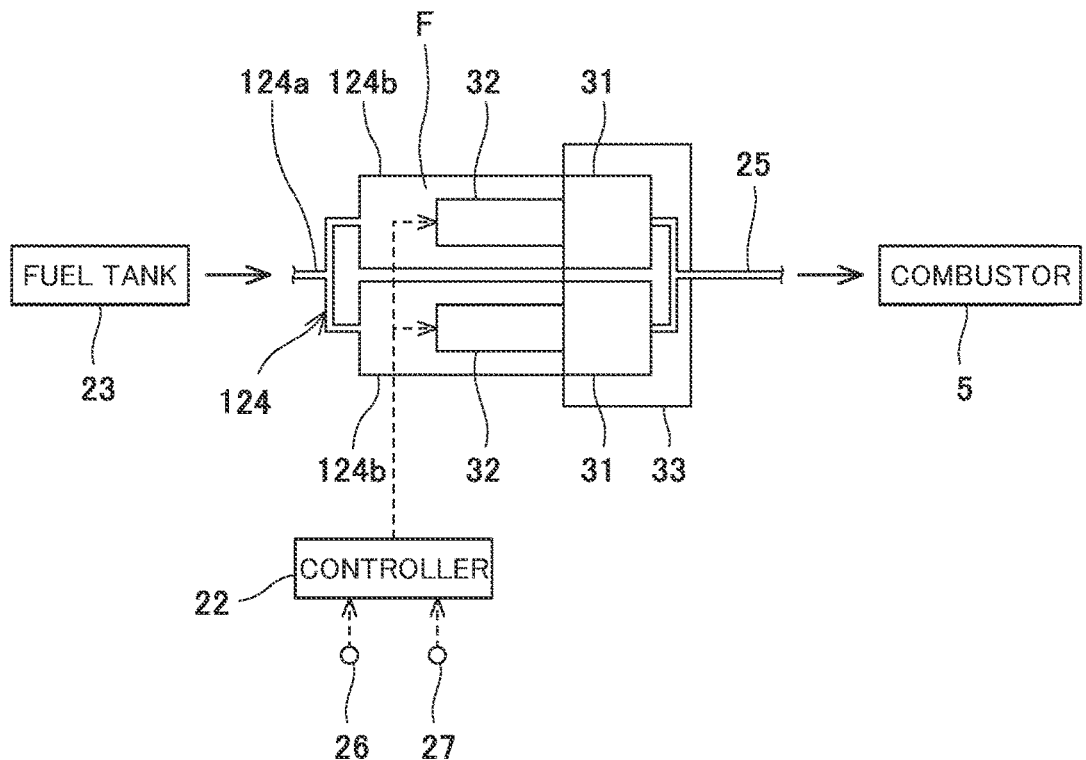
FIG. 4 is a block diagram of the fuel supply system of Embodiment 2.

FIG. 4 is a block diagram of the fuel supply system of Embodiment 2. The same reference signs are used for the same components as in Embodiment 1, and the repetition of the same explanation is avoided. As shown in FIG. 4, in Embodiment 2, a fuel inflow member 124 includes an inflow pipe portion 124a and a buffer tank portions 124b (heat exchanger portions). The inflow pipe portion 124a is connected to the fuel tank 23. The buffer tank portions 124b are connected to the inflow pipe portion 124a in series. The buffer tank portions 124b are arranged in parallel. The buffer tank portions 124b communicate with the respective fuel pumps 31. Each buffer tank portion 124b may be connected to the corresponding fuel pump 31 through a pipe.

The buffer tank portions 124b accommodate the respective electric motors 32 and cover the electric motors 32 one by one. To be specific, the electric motors 32 are immersed in the fuel F in the corresponding buffer tank portions 124b. The electric motors 32 may partially immersed in the fuel F in the corresponding buffer tank portions 124b.

According to this configuration, the electric motors 32 are cooled by the fuel F. Therefore, the number of parts is reduced, and the number of electric motors 32 is prevented from increasing. Thus, the gas turbine engine can be downsized. Moreover, since the fuel F increases in temperature by the heat exchange with the operating electric motors 32, an increase in energy required for the discharge of the fuel pumps 31 under a low-temperature environment can be prevented. Since the other components are the same as those of Embodiment 1, explanations thereof are omitted.

Embodiment 3

Figure 5:
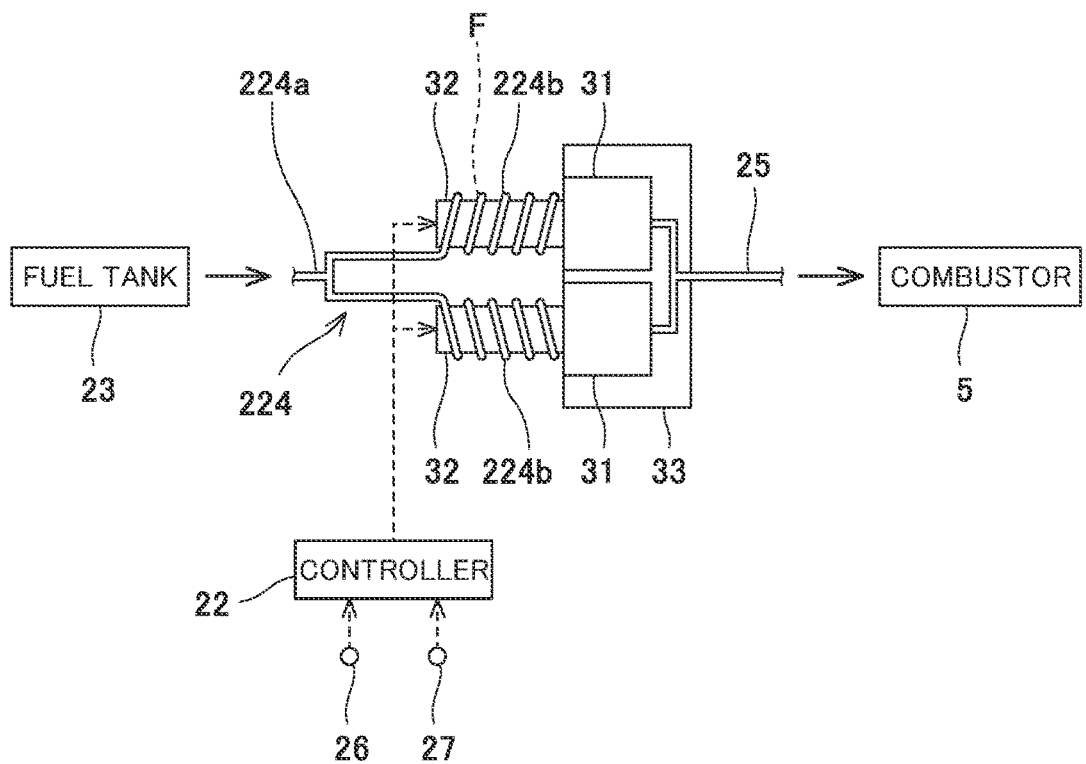
FIG. 5 is a block diagram of the fuel supply system of Embodiment 3.

FIG. 5 is a block diagram of the fuel supply system of Embodiment 3. The same reference signs are used for the same components as in Embodiment 1, and the repetition of the same explanation is avoided. As shown in FIG. 5, in Embodiment 3, a fuel inflow member 224 includes a first inflow pipe portion 224a and second inflow pipe portions 224b (heat exchanger portions). The first inflow pipe portion 224a is connected to the fuel tank 23. The second inflow pipe portions 224b are connected to the first inflow pipe portion 224a in series. The second inflow pipe portions 224b are arranged in parallel. The second inflow pipe portions 224b communicate with the respective fuel pumps 31.

The second inflow pipe portions 224b are adjacent to outer surfaces of the respective electric motors 32 and cover the respective electric motors 32. Specifically, the second inflow pipe portions 224b are wound around and in contact with the outer surfaces of the respective electric motors 32. To be specific, the second inflow pipe portions 224b serve as heat exchangers for the electric motors 32.

According to this configuration, the electric motors 32 are cooled by the fuel F flowing through the second inflow pipe portions 224b. Therefore, the number of parts is reduced, and the number of electric motors 32 is prevented from increasing. Thus, the gas turbine engine can be downsized. Moreover, since the fuel F increases in temperature by the heat exchange with the operating electric motors 32, an increase in energy required for the discharge of the fuel pumps 31 under a low-temperature environment can be prevented. Since the other components are the same as those of Embodiment 1, explanations thereof are omitted.

The present disclosure is not limited to the above-described embodiments, and modifications, additions, and eliminations may be made with respect to the configurations of the embodiments. For example, some of components in an embodiment may be separated and arbitrarily extracted from the other components in the embodiment, and some of components in an embodiment may be applied to another embodiment.

The invention claimed is:

1. A gas turbine engine in which a compressor, a combustor, and a turbine are arranged so as to be lined up along a rotating shaft, the gas turbine engine comprising:
a casing accommodating the compressor, the combustor, and the turbine;
plural fuel pumps arranged outside the casing;
plural electric motors arranged outside the casing and each configured to drive a corresponding one of the plural fuel pumps;
a fuel inflow member including a fuel inflow passage through which fuel to be sucked by the plural fuel pumps flow;
a fuel outflow member including a fuel outflow passage through which the fuel discharged from the plural fuel pumps flows toward the combustor; and
a controller configured to control the plural electric motors in accordance with inputs including a rotational frequency of the rotating shaft and a driving command value, wherein:
the fuel inflow member includes a heat exchanger portion that is thermally connected to the plural electric motors;
the heat exchanger portion is adjacent to the plural electric motors and cools the plural electric motors by heat exchange between the plural electric motors and the fuel flowing through the heat exchanger portion;
the heat exchanger portion of the fuel inflow member covers the plural electric motors from outside;
the heat exchanger portion is a common buffer tank portion that accommodates the plural electric motors;

the electric plural motors are lined up in a circumferential direction along an outer peripheral surface of the casing;

the common buffer tank portion has an arch shape along the outer peripheral surface of the casing; and the controller is configured to determine, based on the inputs, one electric motor to be stopped among the plural electric motors such that the number of operating electric motors in operation decreases, wherein the plural electric motors are immersed in the fuel in the heat exchanger portion.

2. The gas turbine engine according to claim 1, wherein: the common buffer tank portion includes a buffer space and a fuel inlet through which a fuel tank communicates with the buffer space; and the fuel inlet is located at an opposite side of a position of the plural fuel pumps across the electric motors.

3. The gas turbine engine according to claim 1, wherein the heat exchanger portion of the fuel inflow member is a buffer tank covering the plural electric motors from outside.

4. The gas turbine engine according to claim 3, wherein the plural electric motors are immersed in the fuel that exists between an outer surface of the plural electric motors and an inner wall surface of the buffer tank.

5. The gas turbine engine according to claim 1, wherein the heat exchanger portion of the fuel inflow member is an inflow pipe portion of the fuel inflow member, the inflow pipe portion being adjacent to an outer surface of the plural electric motors.

6. The gas turbine engine according to claim 5, wherein the inflow pipe portion is wound around the outer surface of each of the plural electric motors.

\* \* \* \* \*